Patented Apr. 18, 1944

2,347,000

UNITED STATES PATENT OFFICE 2,347,000

PROCESS OF PREPARING MONOCHLOROMONOBROMOMETHANE AND DIBROMOMETHANE

Otto Scherer and Franz Dostal, Frankfort-on-the Main, and Karl Dachlauer, Hofheim in Taunus, Germany; vested in the Alien Property Custodian No Drawing. Application May 23, 1941, Serial No. 394,870. In Germany March 19, 1940

13 Claims. (Cl. 260—658)

The present invention relates to a process of preparing monochloromonobromomethane and dibromomethane.

It is known that by reaction of aliphatic chlorinated hydrocarbons with aluminium bromide chlorine may be exchanged for bromine and aliphatic brominated hydrocarbons may be obtained. Since the preparation of aluminium bromide is, however, rather complicated and its handling is not agreeable, it would be of considerable advantage for the industrial preparation of brominated hydrocarbons if instead of $AlBr_3$ elementary bromine and aluminium could be used. The pertinent art discloses only poor and contradictory statements about the results of this method of working. It is stated that besides worthless resinous products brominated hydrocarbons are mainly obtained which do not correspond with the chlorinated hydrocarbons used as parent materials.

Indeed, experiments with numerous aliphatic chlorinated hydrocarbons, also with those still containing hydrogen in the molecule, have shown that the exchange of chlorine for bromine by using bromine and aluminium instead of aluminium bromide encounters great difficulties. Considerable quantities of resinous by-products or reaction products of high molecular weight are formed which render the process unsuitable.

Now, we have found as a surprising fact that the exchange of chlorine for bromine in halogenmethane compounds containing two hydrogen atoms, namely, in the methylene chloride and the monochloromonobromomethane, takes a very smooth course when bromine and aluminium are used and that only an unimportant quantity of by-products is formed. The exchange takes place according to the following equations:

$6CH_2Cl_2 + 2Al + 3Br_2 = 6CH_2ClBr + 2AlCl_3$
$3CH_2Cl_2 + 2Al + 3Br_2 = 3CH_2Br_2 + 2AlCl_3$
$6CH_2ClBr + 2Al + 3Br_2 = 6CH_2Br_2 + 2AlCl_3$

A smooth course of these reactions could not be expected since, as it is known, methyl chloride reacts easily with aluminium with formation of organometallic compounds, chloroform reacts with aluminium with formation of undefined resinous products and carbon tetrachloride reacts with aluminium with formation of hexachlorethane. Monochloromonobromomethane also reacts easily with aluminium with an entire transformation into resinous products of high molecular weight.

For the reaction of the said halogenated hydrocarbons in which chlorine is to be exchanged for bromine it is advantageous to use a sufficient excess of the halogenated hydrocarbon so that the reaction liquid remains well stirrable with the sludgy aluminium chloride obtained. It has, furthermore, proved to be advantageous to add somewhat larger quantities of aluminium than those calculated stoichiometrically in order to attain a condition wherein the reaction liquid no longer contains free bromine when the reaction is finished.

In the preparation of monochloromonobromomethane from methylene chloride by simultaneous action of bromine and aluminium on methylene chloride, the formation of dibromomethane may be the more repressed, the larger the excess of the methylene chloride used is in proportion to the aluminium and bromine, respectively.

The following examples serve to illustrate the invention but they are not intended to limit it thereto:

(1) Preparation of monochloromonobromomethane from methylenechloride.

500 grams of methylenechloride and 60 grams of aluminium in the form of shavings or waste of sheets are placed into a vessel provided with a reflux apparatus, a feeding device for bromine, a thermometer and a stirrer and, without stirring, 25 grams of bromine are caused to run in so that the bromine forms a bottom layer. After a few minutes, reaction sets in which becomes more and more vivid and which becomes apparent by the fact that boiling begins and the temperature rises quickly. When the temperature in the reaction liquid attains about 35° C., 1000 grams of methylene chloride are caused to run in so quickly that the temperature does not fall too much. By adding, while stirring, 455 grams of bromine in such a degree that the reaction mixture is kept gently boiling, the reaction is kept alive. When all the bromine has been introduced, the reaction mixture has a boiling point of about 47° C. Stirring is continued for a short time, advantageously while slightly heating. The reaction liquid no longer contains free bromine and the aluminium used, with the exception of a few grams, is transformed into a fine sludge of aluminium chloride.

The whole batch is cast on ice and the mixture of halogenated hydrocarbons is driven off by means of steam. The mixture of halogenated hydrocarbons which has been separated from the water and dried is worked up by fractional distillation. There are obtained:

| | Grams |
|---|---|
| Recovered methylene chloride | 970 |
| Monochloromonobromomethane | 590 |
| Dibromomethane | 75 |
| Distillation residue | 15 |

(2) By working up in a corresponding manner a batch prepared by means of, all in all,

| | Grams |
|---|---|
| Monochloromonobromomethane | 1,164 |
| Aluminium and | 33 |
| Bromine | 240 | there are obtained besides unchanged monochloromonobromomethane 520 grams of dibromomethane.

We claim:

1. A process of preparing monochloromonobromomethane and dibromomethane by exchange of chlorine for bromine by causing bromine to act on chlorinated methane, containing 2 hydrogen atoms, in the presence of aluminium.

2. A process of preparing monochloromonobromomethane and dibromomethane by exchange of chlorine for bromine by causing bromine to act upon methylenechloride in the presence of aluminium.

3. A process of preparing dibromomethane by causing bromine to act upon monochloromonobromomethane in the presence of aluminium.

4. A process of preparing monochloromonobromomethane and dibromomethane by exchange of chlorine for bromine by causing bromine to act on chlorinated methane, containing 2 hydrogen atoms, in the presence of aluminium, the chlorinated methane being used in excess of that calculated stoichiometrically.

5. A process of preparing monochloromonobromomethane and dibromomethane by exchange of chlorine for bromine by causing bromine to act on chlorinated methane, containing 2 hydrogen atoms, in the presence of an excess of aluminium than that calculated stoichiometrically.

6. A process of preparing monochloromonobromomethane and dibromomethane by exchange of chlorine for bromine by causing bromine to act on chlorinated methane, containing 2 hydrogen atoms, in the presence of aluminium, the chlorinated methane and the aluminium being used in excess.

7. The process as defined in claim 1 wherein the reaction is effected at the boiling point of the reaction mixture.

8. The process as defined in claim 2 wherein the reaction is effected at the boiling point of the reaction mixture.

9. The process as defined in claim 4 wherein the reaction is effected at the boiling point of the reaction mixture.

10. The process as defined in claim 6 wherein the reaction is effected at the boiling point of the reaction mixture.

11. A process of preparing monochloromonobromomethane and dibromomethane by the exchange of chlorine for bromine, which comprises admixing a chlorinated methane, containing 2 hydrogen atoms with aluminum and bromine in an amount insufficient for the substitution reaction, adding chlorinated methane and bromine when the reaction mixture is at the boiling point, and stirring the reaction while maintaining the reaction mixture in the boiling condition.

12. The process as defined in claim 11 wherein the chlorinated methane is methylene chloride.

13. The process of producing monochloromonobromomethane from methylene chloride which comprises admixing methylene chloride, finely divided aluminum and bromine, quickly adding additional quantities of methylene chloride when the reaction mixture commences to boil, adding further quantities of bromine while maintaining the mixture gently boiling, and stirring the reaction mixture at a temperature of about 47° C.

OTTO SCHERER.
FRANZ DOSTAL.
KARL DACHLAUER.